June 12, 1951  G. C. SZIKLAI ET AL  2,556,828
TUNING INDICATOR
Filed Oct. 15, 1946

Inventors
George C. Sziklai
& Robert R. Thalner
BY William A. Zalesak
Attorney

Patented June 12, 1951

2,556,828

UNITED STATES PATENT OFFICE 2,556,828

TUNING INDICATOR

George C. Sziklai, Princeton, N. J., and Robert R. Thalner, Reading, Mass., assignors to Radio Corporation of America, a corporation of Delaware Application October 15, 1946, Serial No. 703,292

6 Claims. (Cl. 313—68)

This invention relates to devices for indicating resonance conditions and signal strength in radio circuits and is particularly useful for frequency modulated or FM signals.

In tuning indicators heretofore used the indication has shown resonance conditions only. When a receiving set, for example, is new and the tuner and discriminator are correctly related, resonance indications would mean that maximum signals are being received but after the set has been in use the correct relation between tuner and discriminator is likely to be impaired and the resonance indicator cannot determine maximum signal.

It is an object of this invention to provide an indicator that visually depicts both the correct tuning and the maximum signal.

Other objects of the invention will appear in the following specification with reference to the drawing in which.

Figure 3:
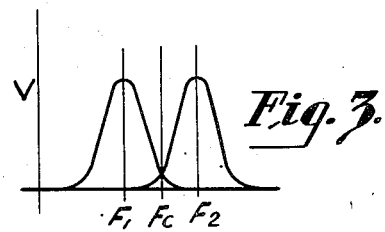
Figure 4:
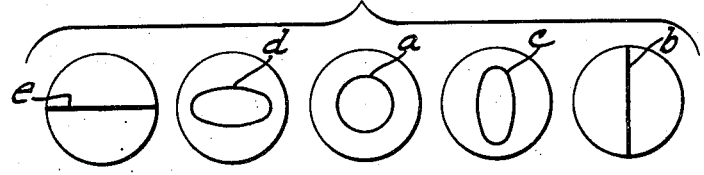

Fig. 3 contains graphs illustrating the voltage-frequency relation of the discriminator circuits; and Fig. 4 is a diagrammatic illustration of tuning and signal conditions.

Figure 1:
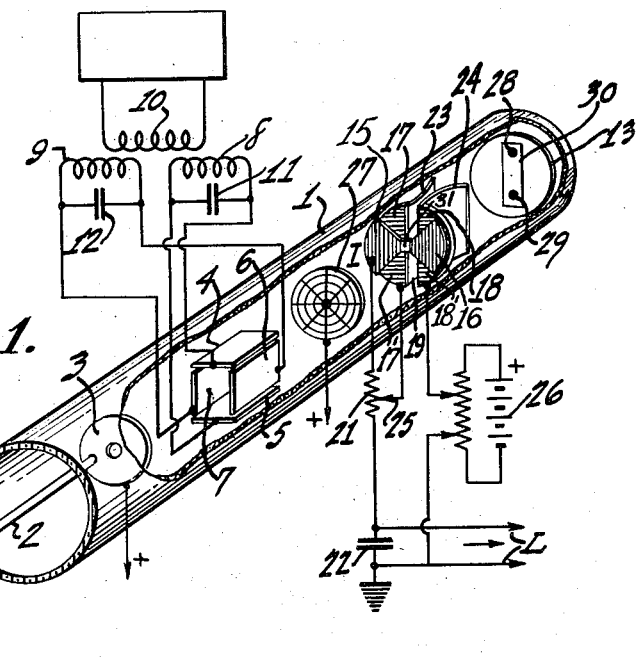
Fig. 1 is a diagrammatic illustration of the improved indicator tube.
Figure 2:
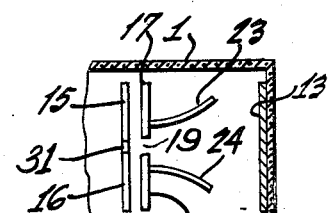
Fig. 2 is a plan of the target used in the indicator with the fluorescent screen shown in section.

Referring to Fig. 1 the indicator tube comprises an evacuated envelope 1 containing elements like those disclosed in the application of co-inventor George C. Sziklai for a frequency modulation, or FM, detector, filed May 20, 1944, Serial No. 536,457, which issued as Patent Number 2,408,702, dated October 1, 1946, with the exception that the target is so constructed as to project the cathode ray beam onto a fluorescent screen to provide an indication of tuning and signal strength conditions. Reference character 2 indicates a cathode for providing the electrons which are formed into a beam by anode 3 containing a suitable aperture to define the beam and to accelerate it along the tube axis. One pair of oppositely disposed deflection plates 4, 5 positioned at 90° to the vertical, as shown in Fig. 1, and another opposite pair 6, 7 positioned vertically, are arranged in spaced relation around the beam. The plates 4, 5 are connected to the terminals of one circuit 8 of a frequency discriminator and the other pair 6, 7 are connected to the terminals of the circuit 9 thereof. These circuits comprise transformer coils coupled to a primary coil 10 connected to receive incoming signals, for example, to the intermediate frequency circuit of a superheterodyne receiver of FM signals. One circuit, say 8, is tuned by the condenser 11 to a frequency F2 somewhat above the upper limit of the signal modulation frequency (Fig. 3) and the other circuit is tuned by its condenser 12 to a frequency F1 somewhat below the lower limit of the signal modulation frequency Fc. The median frequency Fc is the intermediate carrier frequency around which the modulation frequencies center. The ordinates of the graphs indicate voltage in Fig. 3. The Q of the circuits will be adjusted so that at frequency Fc the voltages will be at quadrature.

At the end of the tube remote from the cathode 2 is positioned the fluorescent screen 13. This may be coated on the end of the tube envelope or positioned therein in any other way. In front of the screen is placed the target comprising a first pair of oppositely positioned conducting quarter sectors 15 and 16 which have good secondary emission properties so that their emission ratio is greater than unity. The target further comprises two conducting plates mounted behind the sectors 15 and 16 in insulated relation thereto, with sector portions 17, 17' and 18, 18' exposed to the beam on each side of the sectors 15 and 16, respectively. The plates are spaced from each other to form a slot 19 therebetween. The spaced sector portions 17, 18 and 17', 18' form two oppositely-disposed quarter sectors alternating with the quarter sectors 15 and 16 and bisected by the slot 19. The sectors 15 and 16 are conductively connected as by joining them at the center by a connecting web. Sectors 15 and 15 may have a surface such as caesiated silver oxide or silver magnesium alloy which copiously emits secondary electrons under beam bombardment so as to assume a position potential. The pair of sectors consisting of 17, 18 and 17', 18' may have a carbon surface which as well known is a poor secondary emitter.

Sectors 15 and 16 are connected to ground through resistance 21 and condenser 22 which constitute an integrating circuit for producing the detected signals, as in my said co-pending application, by the scansion of the beam over these sectors. For utilization of the signal the amplifier, not shown, would be connected to lines L. The sector portions 17, 17' and 18, 18' are electrically connected to deflecting plate 23, 24, respectively. Sector portions 17, 17' are connected by slider 25 with resistance 21 at or near its junction with condenser 22. Sector portions 18, 18' are connected to ground through adjustable bias source 26 either positive or negative.

Screen anode 27 which has a higher positive voltage than anode 3 accelerates the electrons to target T and collects secondary electrons emitted thereby.

The operation of our improved indicator may be described as follows:

With an unmodulated carrier Fc the voltages applied to the deflecting plates 4, 5 and 6, 7 are in quadrature and a circle as at $a$ (Fig. 4) is traced over the target. The beam passes through the slot 19 and produces two luminescent spots 28, 29 on the fluorescent screen 13. If the slot 19 is much wider than the diameter of the beam, the spots 28 and 29 will have the form of short arcs or lines. The secondary emission from sectors 15 and 16 makes these sectors go positive and the potential is integrated by resistance 21 and condenser 22 for production of an audio signal. The luminous area may be brought to the center line of the screen 13 by applying a biasing voltage to deflector 24 by source 26.

When the carrier Fc is frequency modulated the trace of the beam will be a right line $b$ (Fig. 4) when frequency F2 is reached. The trace will change through an ellipse as at $c$, then a circle as at $a$ at frequency Fc, then an ellipse $d$ with its major axis at a right angle to that of ellipse $c$, and finally at frequency Fl to a right line at $e$ at a right angle to the line $b$. As the frequency modulation swings back through Fc to F2 the trace will go in the reverse direction from $e$ to $a$. Thus, the modulation frequency will cause the beam to scan the target and pass through slot 19 to produce a line on the screen 13 instead of two spots. Thus, as the user of the receiving set tunes in a station, the carrier will appear as two spots if unmodulated and its strength will be indicated by the diametrical distance between them. If the carrier is modulated the solid line will widen in Fig. 1 to produce luminous rectangle 30. This is due to the increased audio voltage applied to plate 23 by increased current in resistance 21. The strength of the modulation is therefore indicated by the width of the luminous band and tuning of the set will be continued until maximum width is obtained. This maximum is produced by the tuning adjustment even if the tuning be out of correct relation with the discriminator.

While certain specific embodiments have been illustrated and described, it will be understood that various changes and modifications may be made therein without departing from the spirit and scope of the invention.

What we claim as new is:

1. An electron discharge device, comprising an evacuated envelope containing a cathode and an anode adapted to form a cathode ray beam, a fluorescent screen in the path of the beam, a planar target comprising four sectors positioned to be scanned by said beam, one pair of opposite sectors being electrically joined, and having surfaces of high secondary electron emission properties, the other pair of sectors being bisected by a slot and having surfaces of low secondary electron emission properties.

2. An electron discharge device, comprising an evacuated envelope containing a cathode and an anode adapted to form a cathode ray beam, a fluorescent screen in the path of the beam, a circular target between said screen and anode having four quarter sectors positioned to be scanned by said beam, one pair of opposite quarter sectors being electrically joined and having surfaces of high secondary electron emission properties, the other pair of sectors being bisected by a diametrical slot and having surfaces of low secondary electron emissive properties.

3. An electron discharge device, comprising an evacuated envelope containing a cathode and an anode adapted to form a cathode ray beam, a fluorescent screen in the path of the beam, a planar target comprising four sectors positioned to be scanned by said beam, one pair of opposite sectors being electrically joined, and having surfaces of high secondary electron emission properties, the other pair of sectors being bisected by a slot and having surfaces of low secondary electron emission properties, field producing means for deflecting said beam along a diameter in one direction and field producing means for deflecting said beam along a diameter in the direction normal to said one direction.

4. An electron discharge device for frequency modulated waves, comprising an evacuated envelope containing a cathode and an anode adapted to form a cathode ray beam, a fluorescent screen in the path of the beam, a planar target comprising four sectors positioned to be scanned by said beam, one pair of opposite sectors being electrically joined, and having surfaces of high secondary electron emission properties, the other pair of sectors being bisected by a slot and having surfaces of low secondary electron emission properties, deflector plates joined to the halves of the second mentioned sectors at opposite sides of said slot.

5. A tuning indicator system for frequency modulated waves, comprising an evacuated envelope containing a cathode and an anode adapted to form a cathode ray beam, a fluorescent screen in the path of the beam, a planar target comprising four sectors positioned to be scanned by said beam, one pair of opposite sectors being electrically joined, and having surfaces of high secondary electron emission properties, the other pair of sectors being bisected by a slot and having surfaces of low secondary electron emission properties, field producing means for deflecting said beam along a diameter normal to said slot and field producing means for deflecting said beam along a diameter normal to said first mentioned diameter, and an integrating circuit between the first mentioned sectors and said cathode.

6. A tuning indicator system for frequency modulated waves, comprising an evacuated envelope containing a cathode and an anode adapted to form a cathode ray beam, a fluorescent screen in the path of the beam, a planar target comprising four sectors positioned to be scanned by said beam, one pair of opposite sectors being electrically joined, and having surfaces of high secondary electron emission properties, the other pair of sectors being bisected by a slot and having surfaces of low secondary electron emission properties, field producing means for deflecting said beam along a diameter in one direction and field producing means for deflecting said beam along a diameter normal to said first mentioned diameter, an integrating circuit connected between the said one pair of sectors and said cathode, the sector portions at one side of said slot being connected to an intermediate part of said circuit and the sector portions at the other side of the slot being connected to a positive source of potential relative to the cathode.

GEORGE C. SZIKLAI.
ROBERT R. THALNER.

REFERENCES CITED

The following references are of record in the file of this patent:

UNITED STATES PATENTS

| Number | Name | Date |
| --- | --- | --- |
| 2,051,188 | Thompson | Aug. 18, 1936 |
| 2,178,238 | Massa et al. | Oct. 11, 1939 |